United States Patent [19]

Swertz

[11] Patent Number: 4,742,702
[45] Date of Patent: May 10, 1988

[54] ANTI-THEFT DEVICE FOR A WHEEL LUG NUT

[76] Inventor: Edward P. Swertz, 28 Williamstown Ct., Apt. 8, Cheektowaga, N.Y. 14227

[21] Appl. No.: 26,036

[22] Filed: Mar. 16, 1987

[51] Int. Cl.$^4$ ............................................. F16B 41/00
[52] U.S. Cl. ...................................... 70/231; 70/232; 411/910
[58] Field of Search ................. 70/231, 229, 230, 232, 70/DIG. 57, DIG. 58; 411/910, 432, 427, 403, 407, 402

[56] References Cited

U.S. PATENT DOCUMENTS

| | | | |
|---|---|---|---|
| 1,853,564 | 4/1932 | Jacobi | 70/229 |
| 1,870,427 | 8/1932 | Stallings | 70/231 |
| 1,900,146 | 3/1933 | Winkler . | |
| 2,286,950 | 6/1942 | Breedlove . | |
| 2,371,121 | 3/1945 | Basquin . | |
| 2,708,844 | 5/1955 | Cimcel | 411/910 |
| 3,540,245 | 11/1970 | Pope . | |
| 3,796,074 | 3/1974 | Vik | 70/231 |
| 3,821,975 | 7/1974 | Haker . | |
| 4,027,572 | 6/1977 | Burge . | |
| 4,037,515 | 7/1977 | Kesselman . | |
| 4,081,979 | 4/1978 | Dawson . | |
| 4,302,137 | 11/1981 | Hart . | |
| 4,324,516 | 4/1987 | Sain et al. . | |
| 4,427,326 | 1/1984 | Hobson et al. . | |

FOREIGN PATENT DOCUMENTS

| | | | |
|---|---|---|---|
| 303545 | 12/1932 | Italy | 70/29 |
| 2095356 | 9/1982 | United Kingdom | 411/910 |

Primary Examiner—Robert L. Wolfe
Attorney, Agent, or Firm—Christel, Bean & Linihan

[57] ABSTRACT

A device for use with a wheel lug nut having a frustoconical exterior surface includes a sleeve-like body adapted to be loosely fitted about the exterior surface of the lug nut so as to substantially cover the exterior surface thereof. The sleeve-like body defines two opposite inner and outer ends and concentrially-arranged, frustoconically-shaped interior and exterior surfaces extending between the inner and outer ends. When operatively positioned about a wheel lug nut used to secure a wheel rim upon a lug stud of a wheel, the sleeve-like body is retained upon the lug nut between the wheel rim and the frustoconical configuration of the lug nut and prevents the lug nut from being tightened or loosened by a tool such as a pipe wrench, operatively clasped about the exterior surface of the sleeve-like body.

14 Claims, 1 Drawing Sheet

ANTI-THEFT DEVICE FOR A WHEEL LUG NUT

BACKGROUND AND SUMMARY OF THE INVENTION

This invention relates generally to wheel lug nuts and relates more particularly to an anti-theft device for a wheel lug nut having a special configuration.

There exists wheel lug nuts having a body defining an inner face for facing or engaging the rim of a wheel when tightened upon a lug stud of the wheel, an opposite outer face and a rounded exterior surface extending between the inner and outer faces which cannot be grasped with a conventional socket or lug wrench. For purposes of tightening or loosening the nut, the outer face of the nut commonly defines openings or recesses for receiving pins which project from a special wrench member to thereby prevent relative rotation between the nut and the wrench member. The wrench member, in turn, is adapted to be operatively clasped by a conventional socket or lug wrench for tightening or loosening the nut as the wrench member is manipulated by the conventional socket or wrench. Because the lug nut cannot be tightened or loosened with relative ease without the special wrench member, the lug nut discourages theft of the wheel by a person not possessing the special wrench member. An example of a wheel lug nut of the aforedescribed type is shown and described in U.S. Pat. No. 3,821,975.

Inasmuch as the aforedescribed lug nut body has a rounded exterior surface, the nut body with which this invention is concerned is one which is generally frustoconical in configuration. More specifically, the diameter of the nut as measured across the inner face is smaller than the diameter of the nut as measured across the outer face.

Wheel lug nuts of the aforedescribed type and special configuration are limited as theft-proof devices in that a tool, such as a pipe wrench, can be operatively fitted or clasped about the rounded exterior surface of the nut for loosening the nut.

It is, accordingly, an object of the present invention to provide a new and improved device enhancing the theft-proof quality of the nut of the aforedescribed type and configuration.

Another object of the present invention is to provide a device for positioning about the exterior surface of the nut to thereby prevent the nut from being manipulated about a wheel lug stud by a pipe wrench or the like operatively clasped about the exterior surface of the nut.

Still another object of the present invention is to provide such a device of such configuration that its shape retains the device about a tightened wheel lug.

Yet still another object of the present invention is to provide such a device which is economical to manufacture and effective in operation.

This invention resides in an anti-theft device for use with a wheel lug nut of the aforedescribed type and configuration for enhancing the theft-proof quality of the nut.

The device is comprised of an elongated sleeve-like body having two opposite inner and outer ends and interior and exterior surfaces extending between the inner and outer ends. The exterior surface is generally rounded in shape as the sleeve-like body is viewed in a radial cross section, and the interior surface is shaped complementary to that of the frustoconical form of the exterior surface of the nut. The sleeve-like body is of such size to be loosely fitted about and substantially cover the exterior surface of the nut to thereby be retained upon the nut between the wheel rim and the frustoconical configuration of the lug nut and to thereby permit relative rotation between said sleeve-like body and the lug nut if the exterior surface of the sleeve-like body is manipulated with a pipe wrench and the like.

BRIEF DESCRIPTION OF THE DRAWING FIGURES

DETAILED DESCRIPTION OF AN ILLUSTRATIVE EMBODIMENT

Figure 1:
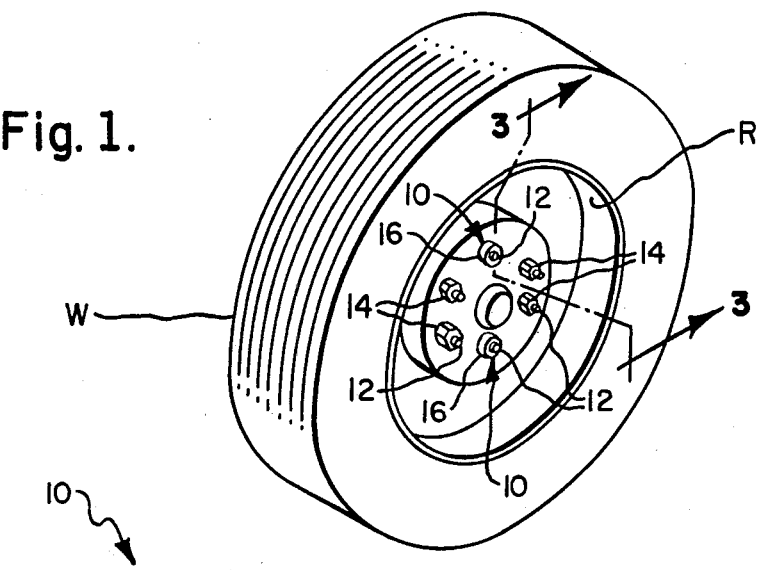
FIG. 1 is a perspective view of a wheel and hub assembly with which the device of the present invention is utilized.

Turning now to the drawings in greater detail and considering first FIG. 1, there is shown a wheel environment in which two identical embodiments, generally indicated 10,10, of the device of this invention are utilized. More specifically, the FIG. 1 environment includes a wheel W having a rim R shown operatively secured upon six lug studs 12,12 of a wheel hub with four conventional, standard "hex" lug nuts 14,14,14,14 and two wheel lug nuts 16,16 having a frustoconical outer configuration as described in greater detail hereinafter. Each of the standard "hex" lug nuts 14 or 14 has an exerior configuration permitting the nut 14 to be tightened or loosened upon the corresponding lug stud 12 with a conventional socket or lug wrench. The lug nuts 16,16 have generally rounded exterior configuration, and each each device 10 or 10 is operatively positioned about a corresponding lug nut 16 or 16 to prevent the lug nut 16 or 16 from being removed by a pipe wrench or similar tool clasped about the exterior surface of the lug nut 16.

Figure 2:
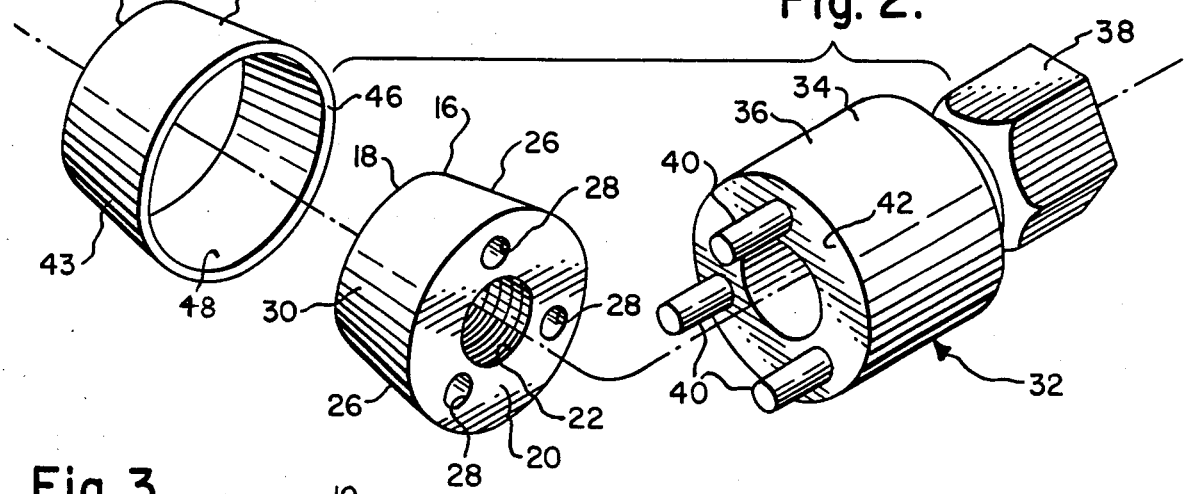
FIG. 2 is an exploded perspective view of a wheel lug nut wrench member assembly with which the device of this invention is utilized.
Figure 3:
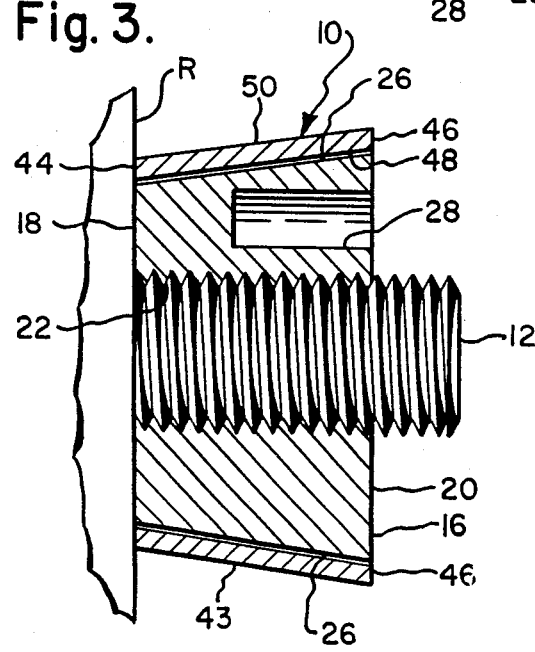
FIG. 3 is a cross-sectional view taken about on lines 3—3 of FIG. 1.

With reference to FIGS. 2 and 3, the lug nut 16 with which the device 10 is utilized is in the form of a steel body 26 having opposite inner and outer faces 18,20, respectively, and a central, internally-threaded through-bore 22 or aperture extending between the inner and outer faces 18 and 20. Each of the faces 18 or 20 is generally planar and parallel to the other face 20 or 18. When the lug nut 16 is operatively positioned upon a wheel lug stud 12 or 12, the inner face 18 of the nut body 26 generally faces and engages the wheel rim R. The outer face 20 further defines a plurality of openings 28,28 in the form of recesses disposed thereover and extending axially into the nut body 26 from the outer face 20 thereof. As best shown in FIG. 3, the nut body 26 further defines an annular exterior surface 30 which is frustoconical in configuration with its base, or larger end, corresponding with the outer face 20. More specifically, frustoconical configuration of the nut body provides the inner face 18 with a smaller diameter than that of the outer surface 20.

With reference still to FIG. 3, the nut body 26 is adapted to be tightened or loosed upon a wheel lug 12 by means of a special wrench member or key 32. The key 32 includes a steel body 34 having a major cylindrical portion 36, a "hex" nut-like portion 38 fixedly attached to one end of the major portion 36 and means defining a plurality of pins 40,40 fixedly attached to and projecting axially from an end surface, indicated 42 of the major portion 36 opposite the nut-like portion 38. The pins 40,40 so arranged or disposed upon the end surface 42 that the pins 40,40 can be collectively received by the openings 28,28 defined in the outer face 20 of the lug nut body 26. It follows that the number of pins 40,40 is no greater than the number of nut body openings 28,28. By positioning the pins 40,40 within the nut body openings 28,28, the key 32 is operatively interlocked or meshed with the lug nut body 26 to prevent relative rotation between the lug nut 16 and the key 32 about a lug stud 12. While the key 32 and lug nut body 26 remain in such an interlocked relationship, the lug nut 16 can be tightened or loosed upon the wheel lug 12 by appropriately manipulating or rotating the key 32 with a conventional socket or lug wrench clasped about the nut-like portion 38 of the key 32.

In accordance with the present invention and with reference to FIGS. 2 and 3, the device 10 of this invention is adapted to be loosely positioned about the lug nut 16 so as to substantially cover the frustoconical surface 30 of the lug nut 16 and of such configuration that its shape retains the device 10 about the nut 16 when the nut 16 is tightened upon a wheel lug stud 12. To this end, the device 10 is in the form of a hollow sleeve-like body 43 having two opposite inner and outer ends 44,46, respectively, and concentrically arranged interior and exterior surfaces 48,50, respectively, as shown in FIG. 2 extending between the inner and outer ends 44,46. The inner and outer ends 44,46 are each generally contained in a plane oriented generally parallel to the plane of the other end 46 or 44 and generally perpendicular to the longitudinal axis of the sleeve-like body. The interior surface 48 is shaped complementary to that of the exterior surface 30 of the lug nut 16 so as to provide the interior surface 48 with a frustoconical shape. As best seen in FIG. 3, the diameter of the interior surface 48 as measured across the inner end 44 of the sleeve-like body 43 is smaller than the diameter of the interior surface 48 as measured across the outer end 46. Furthermore, the interior surface 48 is sized to be loosely fitted about the lug nut 16 to permit relative rotation between the lug nut 16 and the device 10 yet fitted closely enough about the lug nut 16 so that when the device 10 is operatively positioned upon a lug nut 16 and the lug nut 16 is operatively tightened upon a wheel lug 12, the sleeve-like body 43 is retainably held upon the lug nut 16 between the wheel rim R and the frustoconical configuration of the lug nut 16.

The exterior surface 50 of the sleeve-like body 43 is rounded in shape as the body 43 is viewed in radial cross section to prevent a conventional socket or lug wrench from being operatively clasped thereabout. More specifically, the exterior surface 50 is frustoconical in configuration so that the base, or larger end, of the frustoconical form corresponds with the base, or larger end, of the frustoconical form of the interior surface 48.

The depth of the sleeve-like body 43 as measured between the planes containing the inner and outer ends 44,46 is about equal to the thickness of the lug nut body 26 as measured between the inner and outer faces 18 and 20 thereof so that when the sleeve-like body 43 is operatively positioned upon the nut body 26, the inner and outer ends 44,46 of the sleeve like body 43 correspond generally with the inner and outer faces 18,20, respectively, of the lug nut body 26. It follows from the above that sleeve-like body 43 substantially covers the exterior surface 30 of the nut body 26 when operatively positioned thereabout.

The sleeve-like body 43 is constructed of a relatively smoothly-surfaced rigid material, such as steel, and of sufficient strength to strongly resist deformation.

In order to operatively install the device 10 upon the lug nut 16 and wheel lug 12, the device 10 is initially moved endwise over the inner face 18 of the lug nut 16 until the device end 46 generally corresponds with the outer face 20 of the nut body 26 and the device end 44 generally corresponds with the inner face 18 of the nut body 26. The lug nut 16, with device 10 positioned thereabout, is then threaded upon the lug 12 and tightened against the wheel rim R by means of the key 32 (FIG. 2) and a conventional socket or lug wrench.

If a pipe wrench or similar tool is tightly clasped around the exterior surface 50 of the device 10 and manipulated or rotated relative to the wheel lug 12 in an effort to loosen the lug nut 16, the device 10 rotates relative to and about the lug nut 16 as the interior surface 48 of the device 10 slips about the exterior surface 30 of the lug nut 16. It has been found that due, at least in part, to the relatively large amount of torque normally required to "break loose" a tightened lug nut 16 from engagement with the wheel rim R and the smoothness of the engaging surfaces 30 and 48, the lug nut 16 is extremely difficult to rotate with a pipe wrench clasped about the device 10, no matter how hard the pipe wrench is compressed upon the exterior surface 50 of the device 10. It follows that the device 10 effectively prevents the lug nut 16 from being removed from a lug stud 12 by means of a pipe wrench or similar tool and thus effectively enhances the theft-proof quality of the wheel lug nut 16.

Figure 4:
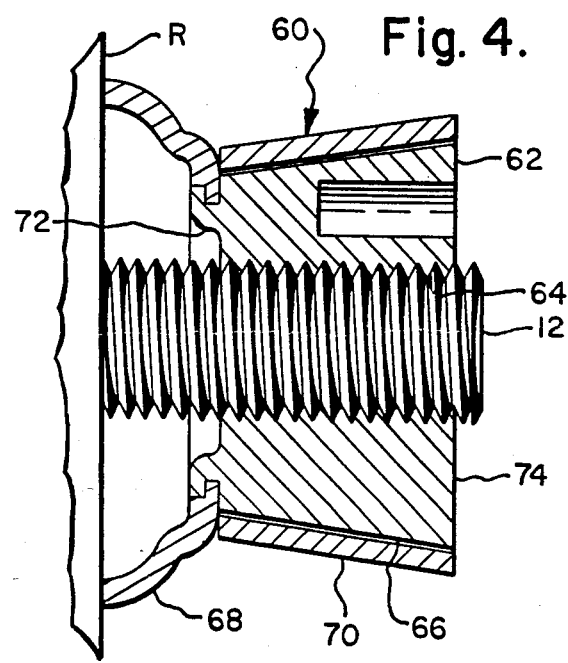
FIG. 4 is a view similar to that of FIG. 3 illustrating an alternative wheel lug nut in which the present invention is embodied.

It will be understood that numerous modifications and substitutions can be had to the aforedescribed embodiments without departing from the spirit of the invention. For example, there is shown in FIG. 4 an embodiment of a flanged wheel lug nut 60 embodying the present invention. More specifically, the lug nut 60 includes a lug nut body 62 having threaded inner bore 64 adapted to be threaded upon a wheel lug stud 16 and an exterior surface 66 of frustoconical configuration, a cup-shaped flange member 68 rotatably secured to the lug nut body 62, and a sleeve-like member 70 loosely positioned about the exterior surface 66 of the lug nut body 62. The lug nut body 62 includes an inner portion 72, and the cup-shaped flange 68 are and inner portion 72 are so shaped as shown that the flange member 68 is interlocked with the lug nut body 62 so as to prevent relative axial movement therebetween yet permit rotational movement therebetween. Such a lug nut 60 is intended for use in a wheel-securing application in which the chances of scratching the wheel rim with a lug nut when tightened thereagainst must be reduced. The lug nut body 62 has an outer face 74 adapted to receive pins of a wrench member similar in construction to the key 32 of FIG. 2, and the sleeve-like member 70 is shaped similar to that of the device 10 of FIGS. 1 and 2. It will be understood that the sleeve-like member 70 is retainably held upon the lug nut body 62 between the cup-shaped member 68 and the frustoconical configuration of the nut body 62.

Furthermore, although the lug nut 16 with which the device of this invention can be utilized has been shown and described above as including a smooth, continuous frustoconical exterior surface, a lug nut with which the device of this invention can be used can include a series of axially-extending grooves in its exterior surface for accommodating the projecting pins of a special wrench member as long as the lands between the adjacent grooves collectively define a frustoconical surface. Accordingly, the aforedescribed embodiment is intended for the purpose of illustration and not as limitation.

What is claimed is:

1. An anti-thief device for use with a wheel lug nut having a body defining an inner face for facing a wheel rim secured by the lug nut, an opposite outer face and an exterior surface extending between the outer and inner faces, said nut body being frustoconical in shape throughout its entire length so that the inner face is smaller than the outer face, said device comprising:

an elongated sleeve-like body having two opposite inner and outer ends and interior and exterior surfaces extending between said inner and outer ends, said exterior surface being frustoconical in shape throughout its entire length so that said inner end is smaller than said outer end and said interior surface being shaped complementary to that of the frustoconical form of the exterior surface of the nut, said sleeve-like body being of such a size that said device body can be loosely fitted about and substantially cover the exterior surface of the nut to thereby be retained upon the nut between the wheel rim and the frustoconical configuration of the lug nut and to thereby permit relative rotation between said sleeve-like body and the lug nut if said exterior surface of said sleeve-like body is manipulated with a pipe wrench and the like.

2. A device as defined in claim 1 wherein the depth of said sleeve-like body as measured between said inner and outer ends is about equal to the distance as measured between the inner and outer faces of the wheel lug nut with which said device is adapted to be used.

3. A device as defined in claim 1 wherein said sleeve-like body is constructed of steel.

4. A device as defined in claim 1 wherein said interior and exterior surfaces of said sleeve-like body are concentrically arranged.

5. In combination:

a wheel lug nut having a body being threadable upon a wheel lug stud and defining an inner face for facing the rim of a wheel secured by said lug nut, an opposite outer face and an exterior surface of frustoconical shape throughout its entire length so that said inner face is smaller than said outer face, and an anti-theft device for positioning about said lug nut body including an elongated sleeve-like body having two opposite inner and outer ends and interior and exterior surfaces extending between said inner and outer ends, said exterior surface being frustoconical in shape throughout its entire length so that said inner end is smaller than said outer end and said interior surface being shaped complementary to that of the frustoconical form of the exterior surface of said nut, said sleeve-like body being of such a size that said device body can be loosely fitted about and substantially cover the exterior surface of the nut to thereby be retained upon said nut between the wheel rim and the frustoconical configuration of said lug nut and to thereby permit relative rotation between said sleeve-like body and said lug nut if said exterior surface of said sleeve-like body is manipulated with a pipe wrench and the like.

6. The combination of claim 5 wherein the outer face of said wheel lug nut defines a plurality of recesses disposed thereover and the combination further comprises a special wrench member including a body and a plurality of pin means protruding from said wrench member body, said pin means adapted to be received by said recesses of said lug nut to prevent relative rotation between said lug nut and said wrench member, and said wrench member body adapted to be operatively clasped by a conventional wrench so that manipulation of said wrench member body by a conventional wrench when said pin means are operatively received by said lug nut recesses tightens and loosens said lug nut.

7. The combination of claim 5 wherein the depth of said sleeve-like body as measured between said inner and outer ends is about equal to the distance as measured between said inner and outer faces of said wheel lug nut.

8. The combination of claim 5 wherein said sleeve-like body is constructed of steel.

9. The combination of claim 5 wherein said interior and exterior surfaces of said sleeve-like body are concentrically arranged.

10. An anti-theft nut for securement of a wheel rim to a wheel lug stud comprising:

a lug nut body being threadable upon a wheel lug stud and having an inner portion for generally facing the rim of a wheel secured by said anti-theft nut, an outer face opposite said inner portion and an exterior surface of frustoconical shape along its entire length as measured between said inner portion and said outer face so that the width of said exterior surface as measured generally across said inner portion is smaller than the width of said exterior surface as measured across said outer face, a generally cup-shaped flange member secured in interlocking relationship about said inner portion to permit relative rotation between said lug body and said flange member and arranged in relationship to said lug body so that the cup of said flange member opens generally in a direction opposite the direction faced by said outer face and said flange member engages the wheel rim when said lug body is operatively tightened upon the wheel lug stud, and a device having a sleeve-like body loosely positioned about said lug body and having two opposite inner and outer ends and interior and exterior surfaces extending between said inner and outer ends, said exterior surface being frustoconical in shape throughout its entire length so that said inner end is smaller than said outer end and said interior surface being shaped complementary to that of the frustoconical form of the exterior surface of said nut, said sleeve-like body being of such size that said device body is loosely fitted about and substantially covers said exterior surface of said lug body to thereby be retained upon said nut between said flange member and the frustoconical configuration of said lug body and to thereby permit relative rotation between said sleeve-like body and said lug body if said exterior surface of said sleeve-like body is manipulated with a pipe wrench and the like.

11. The nut of claim 10 wherein said outer face of said lug nut body defines a plurality of recesses disposed thereover together with a special wrench member including a body and a pluralilty of pin means protruding from said wrench member body, said pin means adapted to be received by said recess of said lug nut to prevent relative rotation between said lug nut and said wrench member, and said wrench member body adapted to be operatively clasped by a conventional wrench so that manipulation of said wrench member body by a conventional wrench when said pin means are operatively received said lug nut recesses tightens and loosens said lug nut body.

12. The nut of claim 10 wherein the depth of said sleeve-like body as measured between said inner and outer ends is about equal to the distance as measured between said inner and outer faces of said lug nut body.

13. The nut of claim 10 wherein each component thereof is constructed of steel.

14. The nut of claim 10 wherein said exterior and interior surfaces of said sleeve-like body are concentrically arranged.

* * * * *